(12) United States Patent
Senger et al.

(10) Patent No.: US 6,701,241 B2
(45) Date of Patent: Mar. 2, 2004

(54) METHOD AND DEVICE FOR OPERATING A CLUTCH

(75) Inventors: Karl-Heinz Senger, Farmington Hills, MI (US); Peter Baeuerle, Ludwigsburg (DE); Bram Veenhuizen, Goirle (NL); Engbert Spijker, Helmond (NL); Gert-Jan van Spijk, Drunen (NL)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 09/929,942

(22) Filed: Aug. 15, 2001

(65) Prior Publication Data

US 2002/0082141 A1 Jun. 27, 2002

(30) Foreign Application Priority Data

Sep. 15, 2000 (DE) .......................... 100 45 756
Nov. 7, 2000 (DE) .......................... 100 55 089

(51) Int. Cl.$^7$ .................. G06F 17/00; G06F 19/00; G06F 7/00
(52) U.S. Cl. ................ 701/67; 701/58; 701/60; 701/68; 701/101; 701/111; 702/41; 702/145; 702/179; 702/182; 73/116; 73/117.3; 342/379
(58) Field of Search ................. 701/58, 60, 67, 701/68, 111, 101; 702/145, 179, 41, 182; 73/116, 117.3; 342/379

(56) References Cited

U.S. PATENT DOCUMENTS 4,497,397 A    2/1985  Windsor et al.
5,010,989 A    4/1991  Huntley
5,200,899 A  * 4/1993  Ribbens et al. ............. 701/111
5,752,592 A    5/1998  Mori

FOREIGN PATENT DOCUMENTS

EP    0 856 678    8/1998
GB    2 234 799    2/1991
GB    2 308 418    6/1997

OTHER PUBLICATIONS

Shawcross et al., A file–million kilometre, 100–vehicle fleet trial, of an air–assist direct fule injection automative 2–stroke engine, 200, Internet, pp. 1–20.*

Setlur et al., Nonlinear control of a continuously variable transmission, 2001, IEEE, pp. 1304–1309.*

* cited by examiner

Primary Examiner—William A. Cuchlinski, Jr.
Assistant Examiner—McDieunel Marc
(74) Attorney, Agent, or Firm—Kenyon & Kenyon

(57) ABSTRACT

A method and device for operating a clutch between an internal combustion engine and at least one driven wheel of a vehicle, a torque being transmitted between the engine and the driven wheel by pressing the clutch together with a clamping force or a clamping load (p), and the clamping force or the clamping load (p) being adjusted as a function of an engine torque generated by the engine, and as a function of the inaccuracy of the information about the engine torque generated by the engine.

38 Claims, 11 Drawing Sheets

METHOD AND DEVICE FOR OPERATING A CLUTCH

Figure 1:
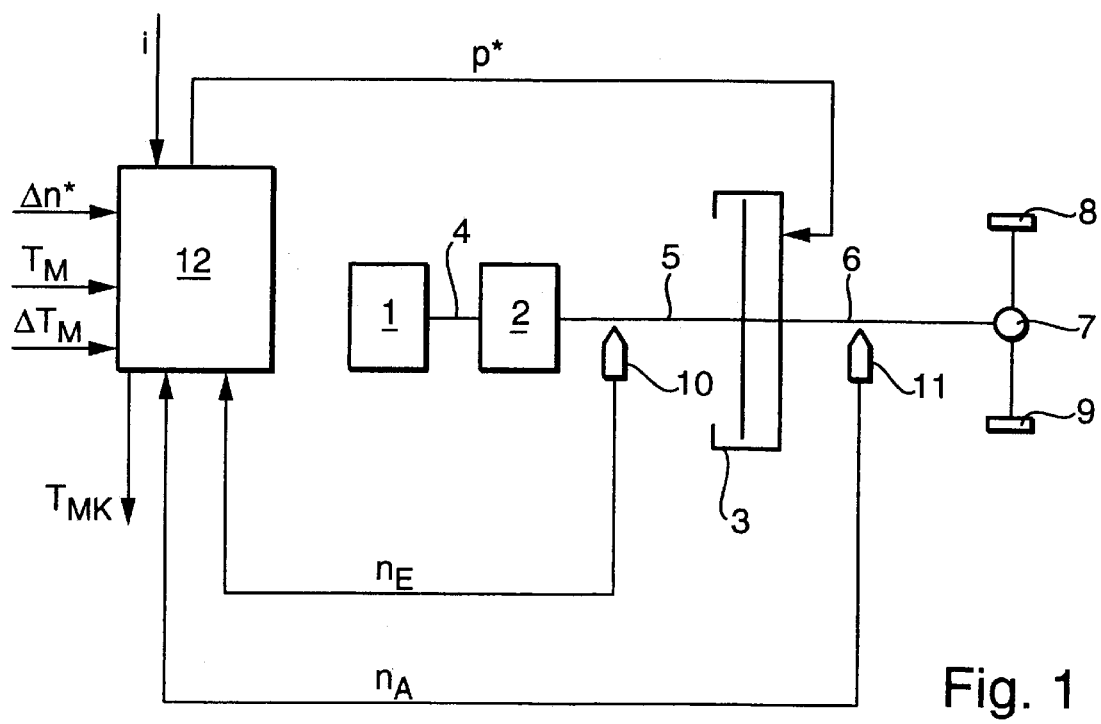

The present invention relates to a method and a device for operating a clutch between an internal combustion engine and at least one driven wheel of a vehicle, a torque being transmitted between the engine and the driven wheel by pressing the clutch together, using a clamping force or a clamping load.

If a clutch is operated with slip, then conclusions can be drawn regarding the transmitted clutch torque, when the friction coefficient of the clutch lining is known. This torque information shall be utilized for determining the input torque of the transmission. An exact measurement of the transmission input torque is especially important in continuously variable automatic transmissions (CVT), in order that the safety pressure in controlling the belt tension of continuously variable transmissions can be reduced, and the transmission efficiency can be increased.

The object of the present invention is to improve the operation of a clutch.

The object is achieved by a method and a device for operating a clutch between an engine and at least one driven wheel of a vehicle, while operating clutch situated between an engine and at least one driven wheel of a vehicle; by pressing the clutch together with a clamping force or a clamping load, a torque being transmitted between the engine and the driven wheel, the clamping force or clamping load being adjusted as a function of an engine torque generated by the engine, and as a function of the inaccuracy of the information about the torque generated by the engine, or as a function of the speed of the engine, and, in particular, certain speed ranges being assigned a specific degree of inaccuracy of the information about the engine torque generated by the engine. In this context, inaccuracy is to be understood as, for example, the standard deviation or a multiple of the standard deviation.

In an advantageous refinement of the present invention, the clamping force or the clamping load is ascertained as a function of a clutch slip in the clutch, while the torque is transmitted between the engine and the driven wheel.

In an advantageous further refinement of the present invention, the clamping force or the clamping load is set as a function of the torque transmitted by the clutch.

In another advantageous refinement of the present invention, the torque transmitted by the clutch is ascertained as a function of the clutch slip in the clutch, while the torque is transmitted between the engine and the driven wheel.

In another advantageous refinement of the present invention, the clamping force or the clamping load is adjusted as a function of the friction coefficient of the clutch.

In another advantageous refinement of the present invention, the coefficient of friction of the clutch is ascertained as a function of the clutch slip in the clutch, while the torque is transmitted between the engine and the driven wheel.

In another advantageous refinement of the present invention, the correlation between the torque transmitted by the clutch and the clutch slip, or the correlation between the friction coefficient of the clutch and the clutch slip, are adapted when the (known) inaccuracy of the information about the engine torque is less than or equal to a first tolerance value.

In a further advantageous refinement of the present invention, the adaptation is carried out as a function of the clamping force or the clamping load.

Another advantageous refinement carries out the adaptation as a function of the difference between the clutch slip and a setpoint value for the clutch slip.

In another advantageous refinement of the present invention, the clamping force or the clamping load is controlled by an automatic controller, as a function of the difference between the clutch slip and a setpoint value for the clutch slip.

In a further advantageous refinement of the present invention, the adaptation is carried out as a function of the engine torque.

In an additional advantageous refinement of the present invention, the coefficient of friction $\mu$ of the clutch is corrected according to $$\mu = \mu + \frac{T_M \cdot i}{T_M \cdot i + T_R}$$

where $T_M \cdot i$ is the input torque introduced into the clutch by the engine, taking into consideration transmission ratio i of a transmission between the engine and the clutch; and $T_R$ is a differential torque output by the controller.

In a further advantageous refinement of the present invention, the information about the engine torque generated by the engine is corrected, when the (known) inaccuracy of the information about the engine torque is greater than a second tolerance value.

In an advantageous refinement of the present invention, the information about the engine torque generated by the engine is corrected as a function of the difference between the clutch slip and the setpoint value for the clutch slip.

In another advantageous refinement of the present invention, the information about the engine torque generated by the engine is corrected according to $$T_{MK} = T_M + \frac{T_R}{i}$$

where $T_M$ is the engine torque;

$T_{MK}$ is the corrected engine torque;

$T_R$ is a differential torque output by the controller; and i is the transmission ratio of a transmission disposed between the engine and the clutch.

In another advantageous refinement of the present invention, the first tolerance value is equal to the second tolerance value.

A particularly advantageous refinement of the present invention provides for the clutch having a clutch lining, and the clutch lining being selected to have a certain friction-coefficient characteristic. This improves the adjustability of the clutch. In particular, the intention here is that, in the range of small clutch-slip values, the friction coefficient of the clutch increase more sharply with increasing clutch slip, than in the range of larger values of clutch slip.

Figure 2:
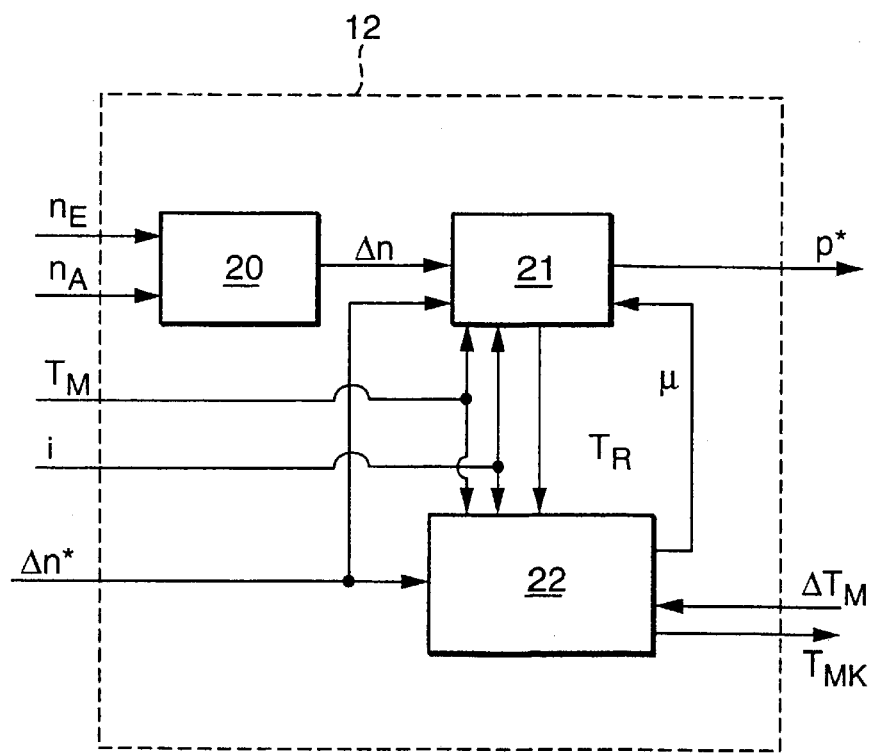
Figure 3:
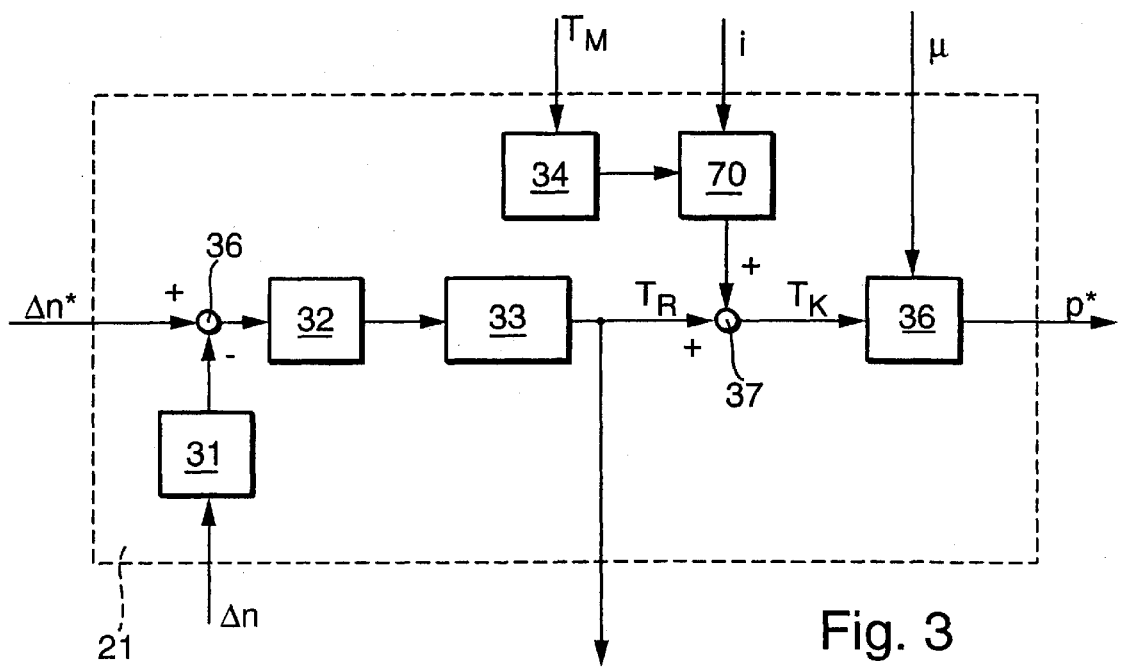
Figure 5:
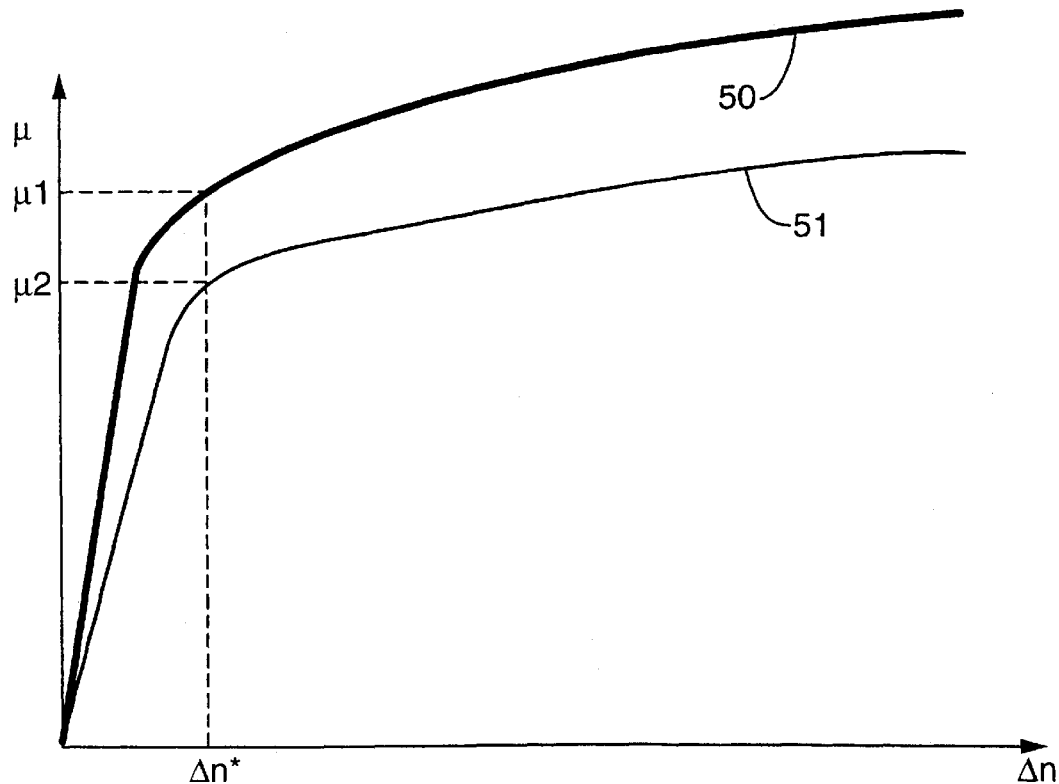
Figure 4:
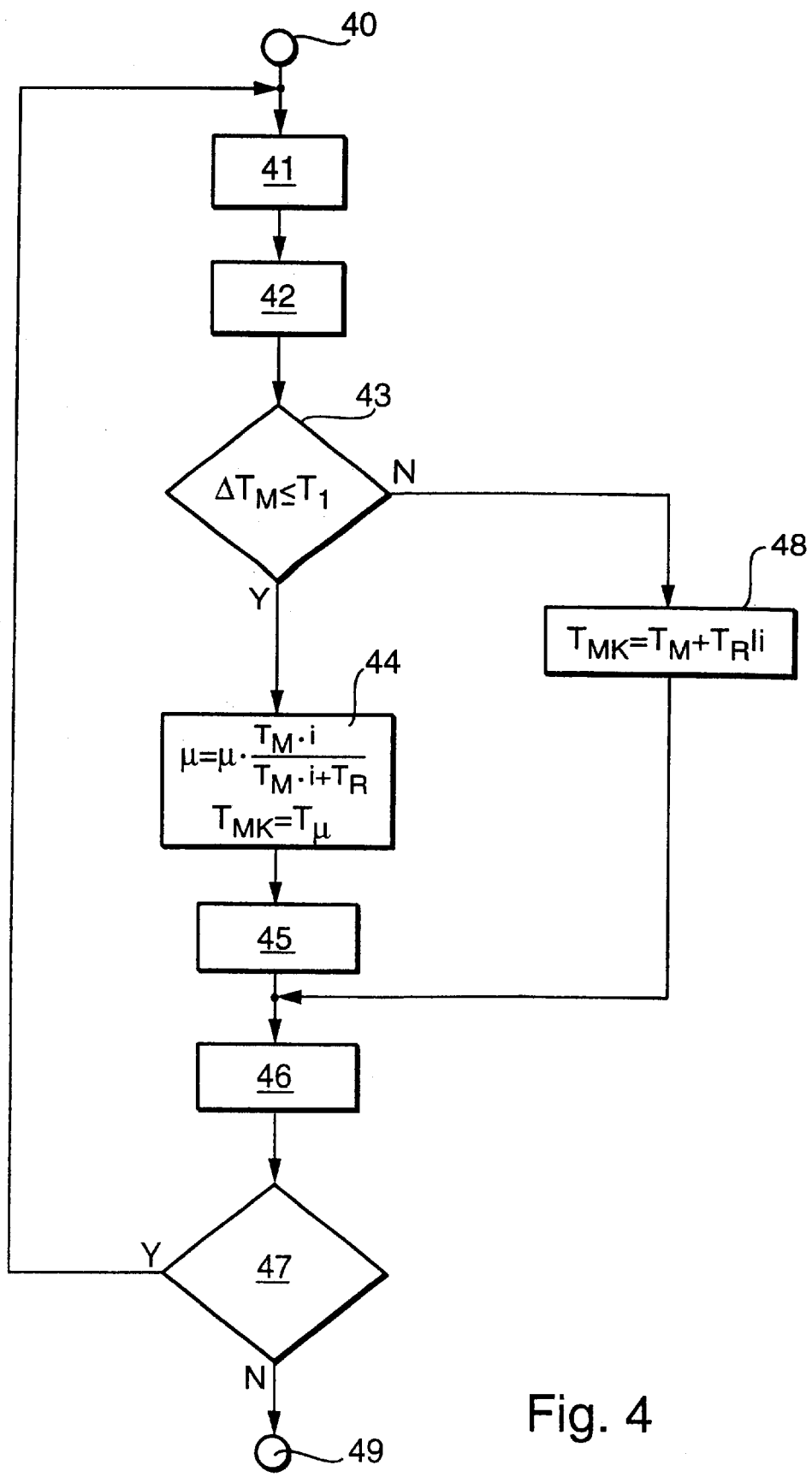
Figure 6:
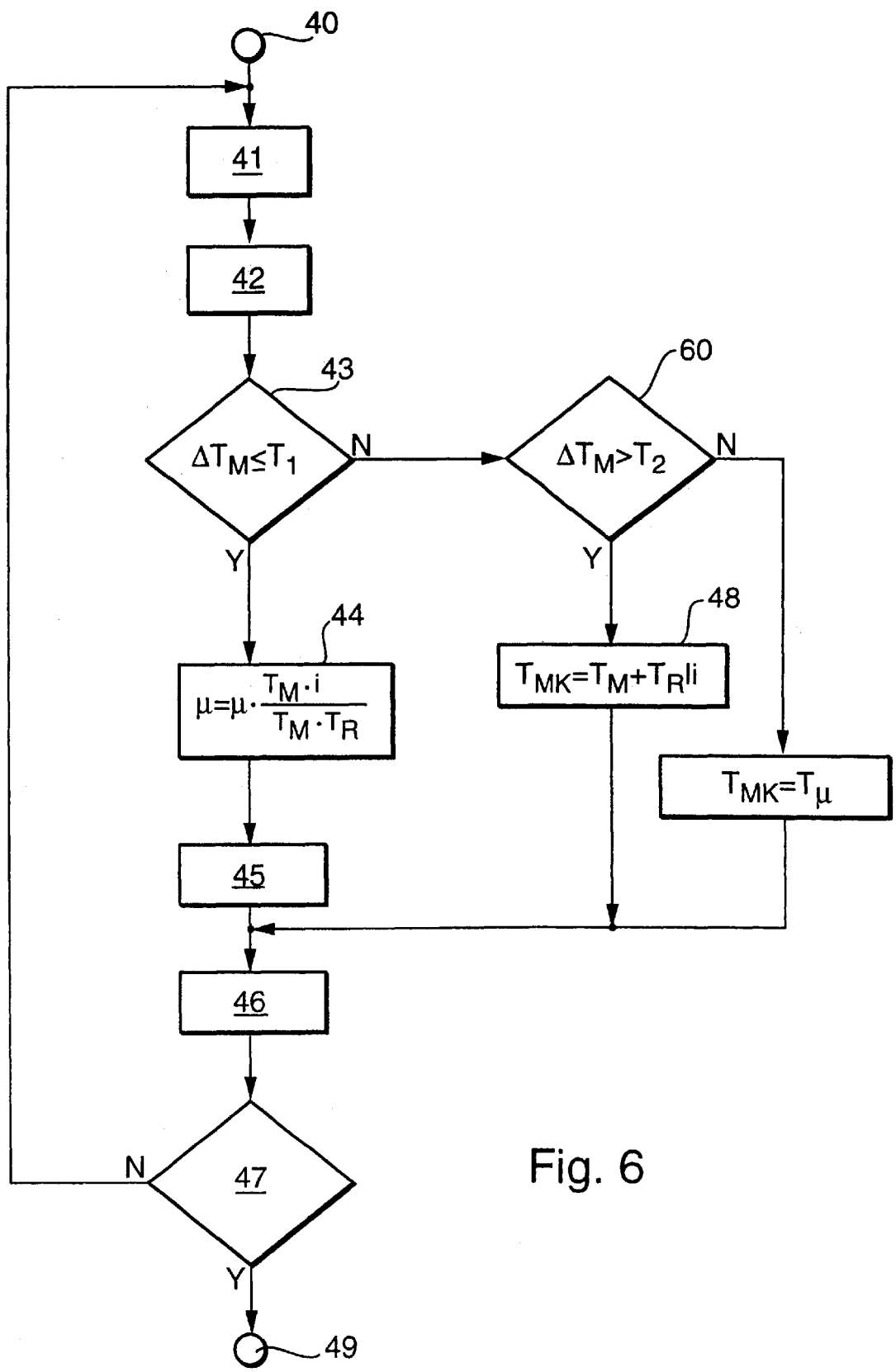
Figure 7:
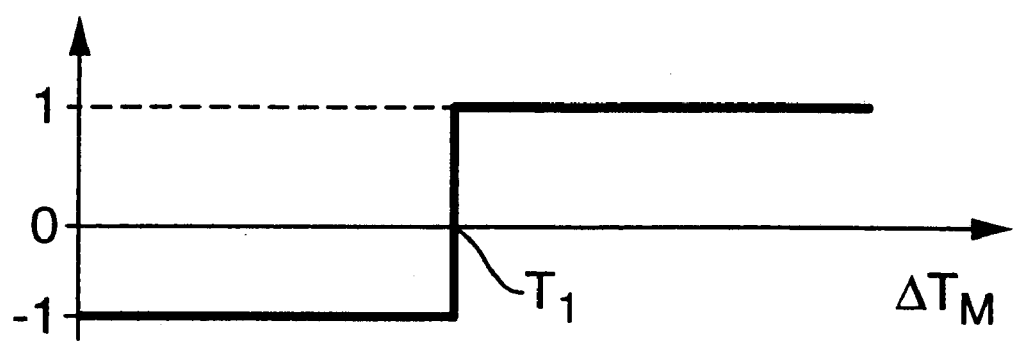
Figure 8:
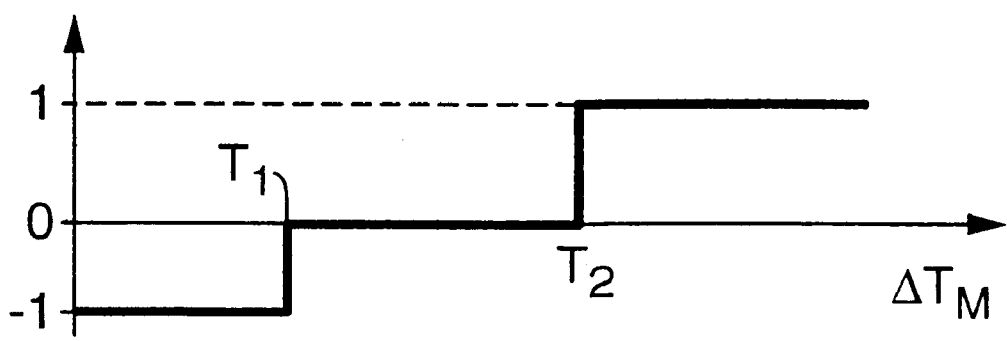
Figure 9:
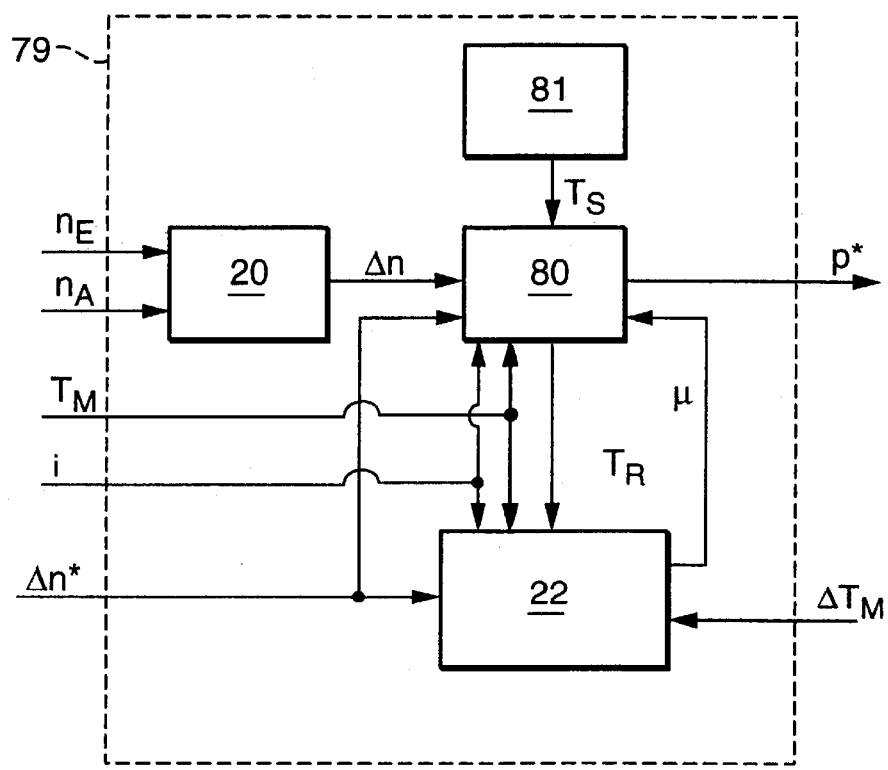
Figure 10:
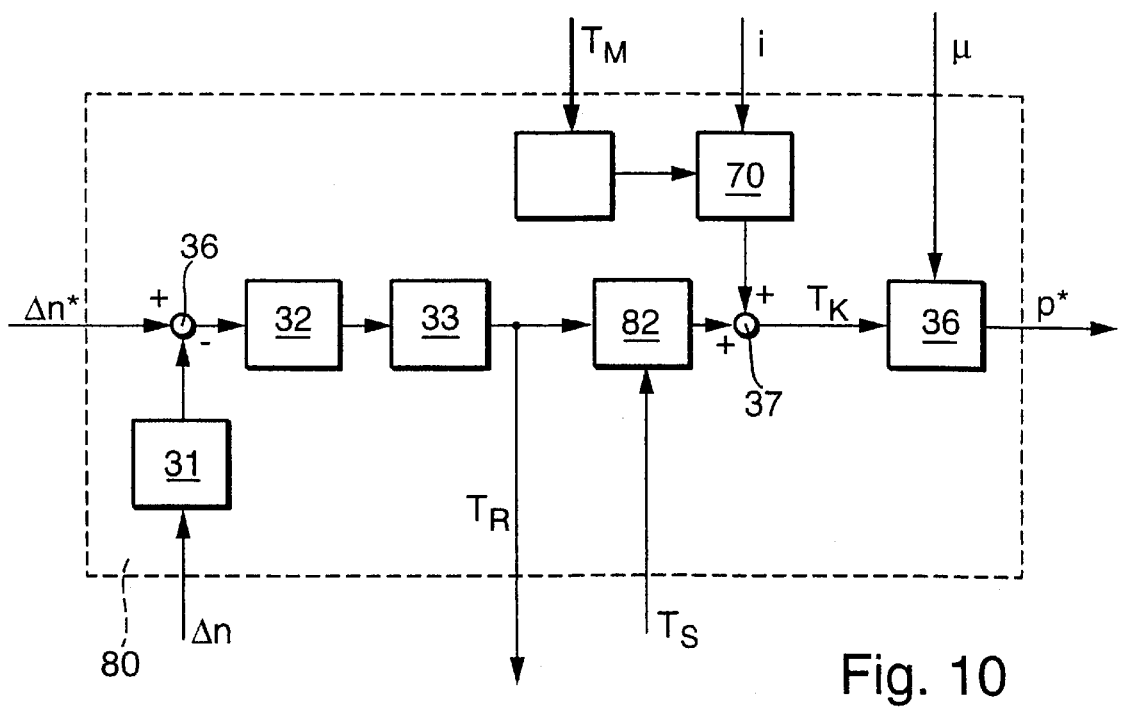
Figure 11:
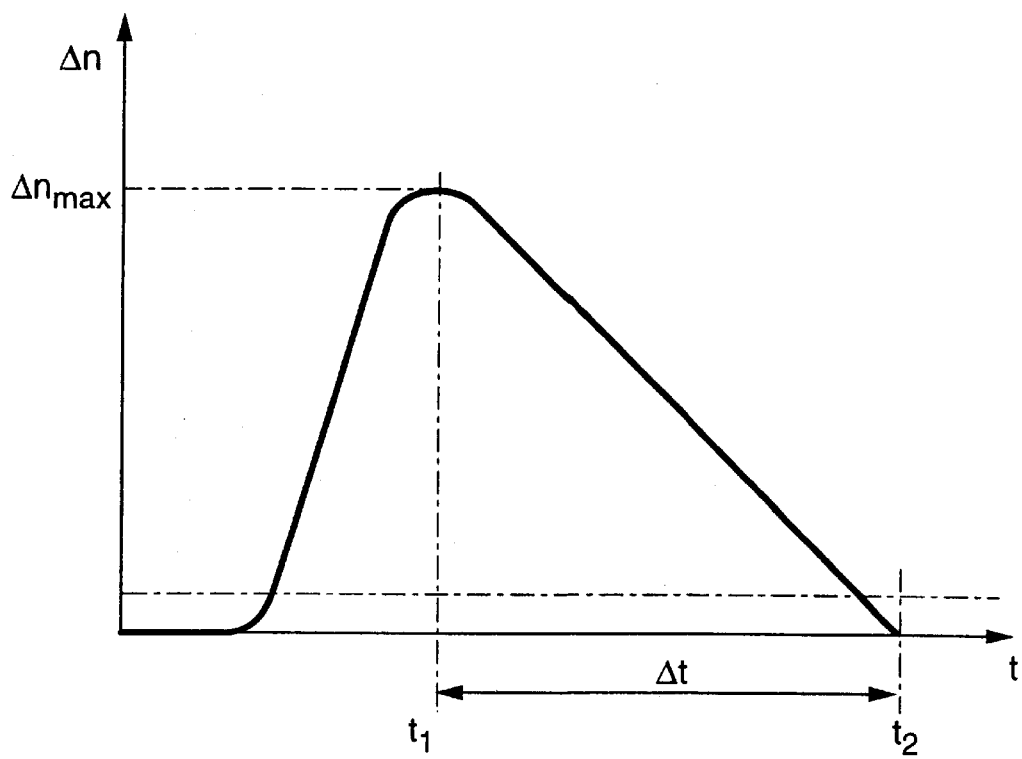
Figure 12:
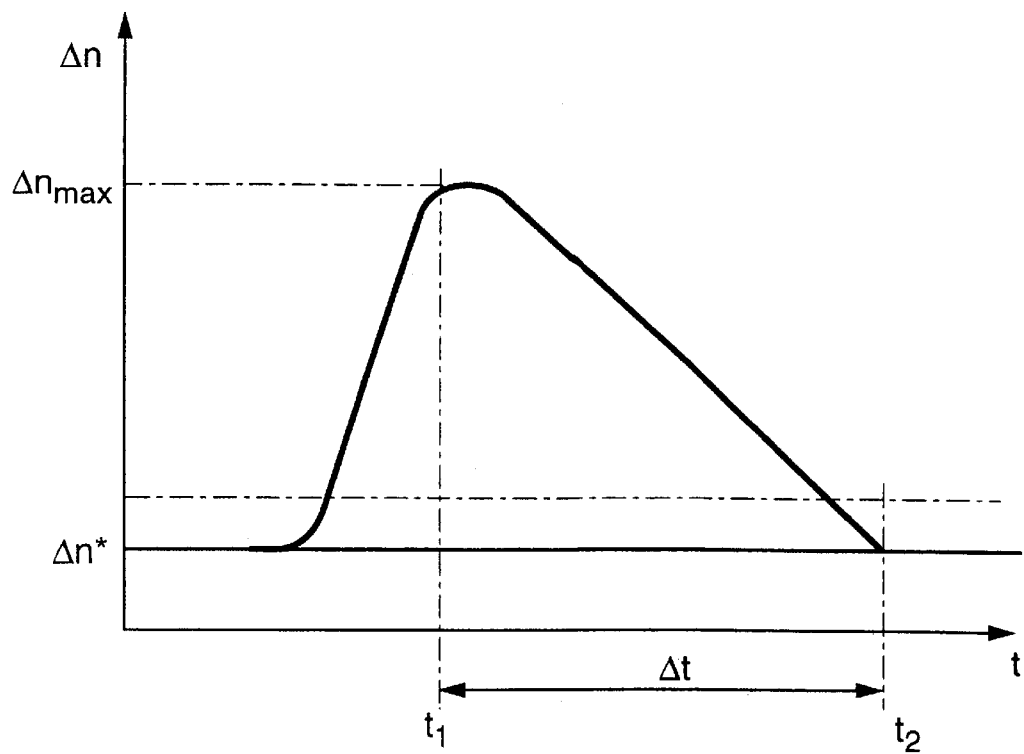
Figure 14:
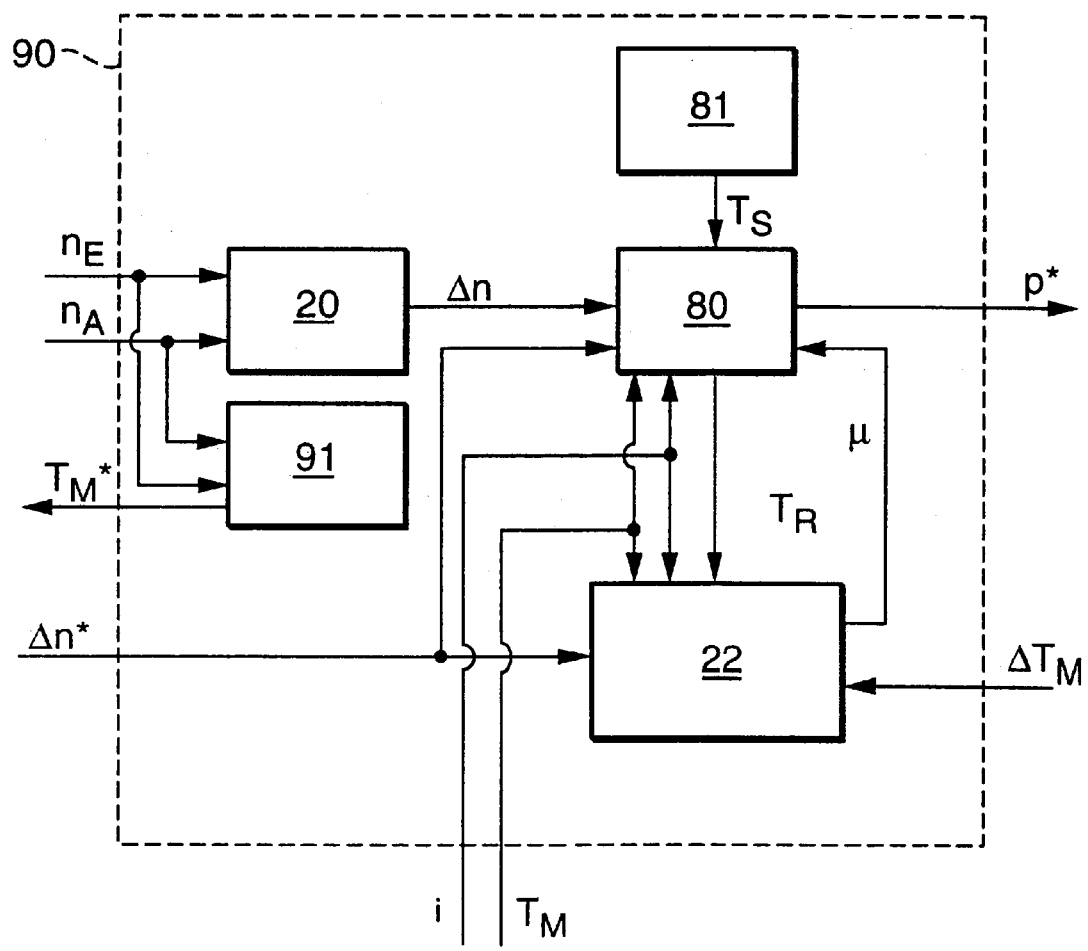
Figure 15:
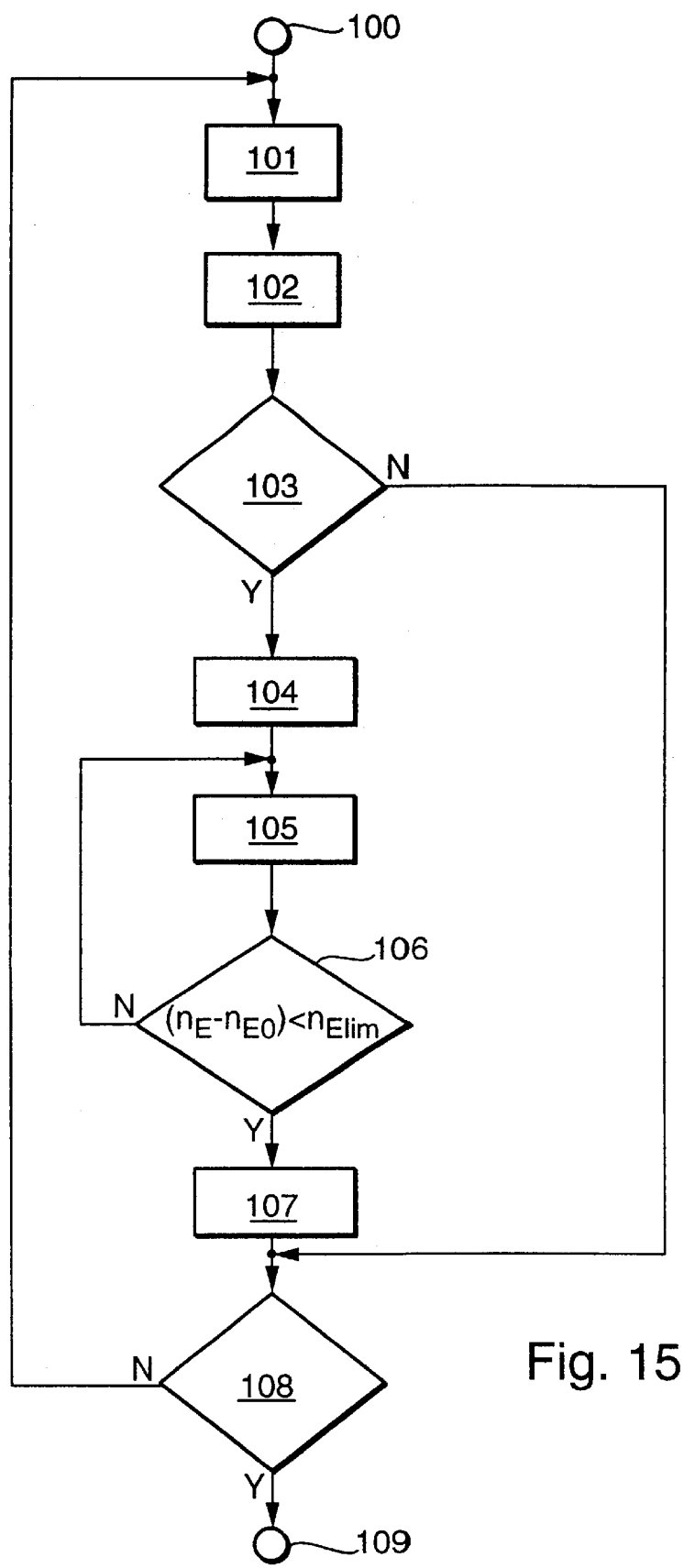

Further details and advantages are elucidated in the following description of exemplary embodiments. The individual figures show:

FIG. 1 a drive unit for a motor vehicle;
FIG. 2 a clutch control unit;
FIG. 3 a slip controller;
FIG. 4 a flowchart;
FIG. 5 a characteristic curve of the coefficient of friction versus slip;
FIG. 6 a flowchart;
FIG. 7 an explanation of the flowchart according to FIG. 4;

FIG. 8 an explanation of the flowchart according to FIG. 6;

FIG. 9 an advantageous exemplary embodiment of a clutch control unit;

FIG. 10 an alternative exemplary embodiment of a slip controller;

FIG. 11 slip plotted with respect to time;

FIG. 12 slip plotted with respect to time;

FIG. 13 a clutch;

FIG. 14 a further exemplary embodiment of a clutch control unit;

FIG. 15 a flowchart for an engine-torque setpoint adjuster; and

Figure 16:
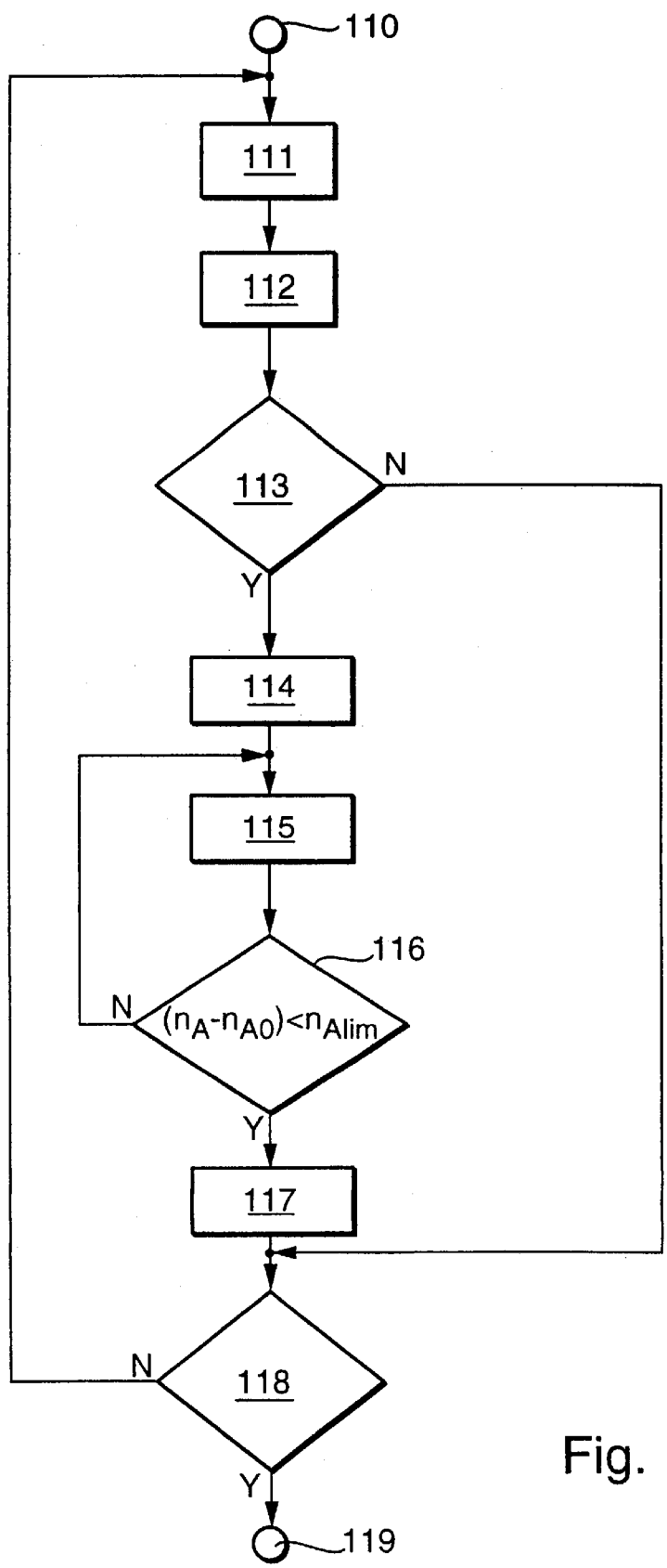

FIG. 16 an additional flowchart for an engine-torque setpoint adjuster.

FIG. 1 shows a drive unit for a motor vehicle. In this context, reference numeral 1 denotes an engine, which is connected to an automatic transmission 2 by a shaft 4. Automatic transmission 2 is advantageously designed as a continuously variable transmission. Automatic transmission 2 is connected to driven wheels 8, 9 via a clutch input shaft 5, a clutch 3, a clutch output shaft 6, and a differential 7, in order to drive the motor vehicle. The torque transmitted by clutch 3 can be adjusted by pressing clutch 3 together with a clamping load p. To adjust the torque transmitted by clutch 3, a clutch control unit 12 is provided, which sets the clamping load in clutch 3 in response to the input of a setpoint clamping load p*. The clamping load is synonymous to the clamping force used to press clutch 3 together.

Variables input into clutch control unit 12 include, inter alia, speed $n_E$ of clutch input shaft 5, which is measured by a speed sensor 10, speed $n_A$ of clutch output shaft 6, which is measured by a speed sensor 11, transmission ratio i of automatic transmission 2, a setpoint value $\Delta n^*$ for the clutch slip of clutch 3 (setpoint clutch slip), torque $T_M$ of engine 1, as well as information $\Delta T_M$ about the inaccuracy of the information regarding torque $T_M$ of engine 1. As an alternative, the speed of engine 1 is transmitted, and, from the speed of the engine, a value is determined for $\Delta T_M$, regarding the inaccuracy of the information about torque $T_M$ of engine 1. Furthermore, it can be provided, that the speed of engine 1 be determined from speed $n_E$ of clutch input shaft 5 (or possibly from speed $n_A$ of clutch output shaft 6), or that the value for $\Delta T_M$ regarding the inaccuracy of the information about torque $T_M$ of engine 1 be directly determined from speed $n_E$ of clutch input shaft 5 (or possibly from speed $n_A$ of clutch output shaft 6).

Clutch slip $\Delta n$ is defined as $$\Delta n = n_E - n_A$$

For example, torque $T_M$ of engine 1, as well as information $\Delta T_M$ regarding the inaccuracy of the information about torque $T_M$ of engine 1, are provided by an engine control unit not shown.

FIG. 2 shows clutch control unit 12. It has a differentiator 20, a slip controller 21, as well as an adapter 22. Slip controller 21 is explained in detail in FIG. 3, and the adapter is explained in detail in FIG. 4. The differentiator calculates clutch slip $\Delta n$, which is an input variable that is input into slip controller 21. Other input variables of slip controller 21 include setpoint clutch slip $\Delta n^*$, engine torque $T_M$, transmission ratio i of automatic transmission 2, and coefficient of friction $\mu$. Coefficient of friction $\mu$ is calculated by adapter 22. The input variables for adapter 22 include setpoint clutch slip $\Delta n^*$, transmission ratio i of automatic transmission 2, torque $T_M$ of engine 1, information $\Delta T_M$ regarding the inaccuracy of the information about torque $T_M$ of engine 1, as well as a differential torque $T_R$, which is calculated by slip controller 21. In addition to coefficient of friction $\mu$, a corrected engine torque $T_{MK}$ is another reference variable of adapter 22. Slip controller 21 also calculates setpoint clamping load p*.

FIG. 3 shows the inner design of slip controller 21. Slip controller 21 has a filter 31 for filtering clutch slip $\Delta n$. The difference between setpoint clutch slip $\Delta n^*$ and clutch slip $\Delta n$ filtered by filter 31 is calculated by summer 36. This difference is negated by negator 32, and is the input variable for a controller 33, which is designed as a PID controller in an advantageous refinement. The output variable of controller 33 is differential torque $T_R$.

Engine torque $T_M$ if filtered by filter 34. The engine torque $T_M$ filtered in this manner is multiplied by transmission ratio i of automatic transmission 2, using multiplier 70, and is added to differential torque $T_R$ by a summer 37. The sum of differential torque $T_R$ and the filtered engine torque, which is multiplied by transmission ratio i of automatic transmission 2, is the clutch torque $T_K$ to be transmitted by clutch 3; the clutch torque, together with coefficient friction u, being an input value for an inverse clutch model 35. The following equation is implemented in an exemplary embodiment of inverse clutch model 35:

$$p^* = \frac{1}{A_R}\left(\frac{T_K}{\mu \cdot r \cdot Z_R} + F_0\right)$$

In this context, A is the piston area of clutch 3, r is the effective friction radius of clutch 3, $Z_R$ is the number of friction surfaces of clutch 3, and $F_0$ is the minimum force necessary for clutch 3 to transmit torque.

FIG. 4 shows a flowchart as an implementation of adapter 22. In this context, reference numeral 40 indicates the start of the functional sequence, and reference numeral 49 indicates the end of the functional sequence. In step 41, information $T_M$ about the engine torque, information $\Delta T_M$ regarding the inaccuracy of the information about engine torque $T_M$, differential torque $T_R$, setpoint clutch slip $\Delta n^*$, and clamping load p are input.

In a subsequent step 42, a coefficient of friction $\mu$ is calculated from setpoint clutch slip $\Delta n^*$ and clamping load p. In an advantageous refinement, this is accomplished, using a friction-coefficient-slip characteristic, which is dependent on clamping load p. An example of such a characteristic curve is shown in FIG. 5 and denoted by reference numeral 50.

As can be seen in FIG. 5, the clutch lining is selected so that the variation of the friction coefficient has a certain characteristic curve. The coefficient of friction increases sharply for low slip speeds. This improves the adjustability of the clutch. The curve of the friction coefficient is very flat at higher slip speeds.

Step 42 is followed by interrogation 43, which checks if $$\Delta T_M \leq T_1$$

where $T_1$ is a (first) tolerance value. If $$\Delta T_M \leq T_1$$

then step 44 follows, in which a new friction coefficient $\mu$ of the clutch is calculated according to $$\mu = \mu + \frac{T_M \cdot i}{T_M \cdot i + T_R}$$

and a corrected engine torque $T_{MK}$, is calculated according to $$T_{MK} = T_M$$

Step 44 is followed by step 45, in which the friction-coefficient-slip characteristic 50 dependent on the clamping load is changed in such a manner, that the new values for coefficient of friction $\mu$ and setpoint clutch slip $\Delta n^*$ form a pair of values on modified friction-coefficient-slip characteristic 51. Step 45 is elucidated in FIG. 5. In this context, $\mu_1$ denotes the value of friction coefficient $\mu$ for the effective clamping load prior to execution of step 45, and $\mu_2$ denotes the value of friction coefficient $\mu$ for the effective clamping load after execution of step 45. Coefficient of friction $\mu_1$ is calculated, using characteristic curve 50, as a function of setpoint clutch slip $\Delta n^*$ (see step 42). In step 45, characteristic curve 50 of the friction coefficient versus the clutch slip is modified to form friction-coefficient-clutch-slip characteristic 51, on which value $\mu_2$ and setpoint clutch slip $\Delta n^*$ are a pair of values.

If $$\Delta T_M \leq T_1$$

is not satisfied, then, instead of step 44, step 48 comes next, in which a corrected engine torque $T_{MK}$ is set equal to the sum of engine torque $T_M$ generated by engine 1, and differential torque $T_R$ divided by transmission ratio i of automatic transmission 2:

$$T_M = T_M + T_R/i$$

Step 46 and step 48 are followed by an interrogation 47, which checks if the preceding functional sequence should be repeated. If this is the case, then step 41 follows. If this is not the case, then the functional sequence is ended.

FIG. 6 shows a variation of the flowchart in FIG. 4. In this context, interrogation 43 is not followed by step 48, but rather by interrogation 60. Interrogation 60 checks if $$\Delta T_M > T_2$$

is satisfied, $T_2$ being a second tolerance value. If this condition is fulfilled, then step 48 comes next. However, step 46 is executed, if the condition is not fulfilled.

FIG. 7 and FIG. 8 clarify the differences between the flowcharts according to FIG. 4 and FIG. 6. Information $\Delta T_M$ regarding the inaccuracy of the information about engine torque $T_M$ of engine 1 is represented on the abscissa. The ordinates in FIG. 7 and FIG. 8 indicate which steps are being executed. In this context, the value of −1 symbolizes the execution of steps 44 and 45, the value of 1 symbolizes the execution of step 48, and the value of 0 indicates, that neither steps 44 and 45 nor step 48 is executed. Interrogation 43 in FIG. 4 corresponds to a logic element. The combination of interrogations 43 and 60 in FIG. 6 corresponds to a three-position switch. Of course, these two simple types of switches can also be replaced by complicated switching actions, such as approximately fluid junctions, which, for example, can be designed using fuzzy techniques.

FIG. 9 shows an advantageous exemplary embodiment of a clutch control unit 79, which can be used as a replacement for clutch control unit 12 in FIG. 1. Clutch control unit 79 in FIG. 9 has a slip controller 80 and a protective device 81 for protecting the drive unit, especially automatic transmission 2, from torque surges. The output variable of protective device 81 is a surge torque $T_S$. In an advantageous refinement, torque $T_S$ is calculated according to $$T_S = T_C - \sum_l J_l \cdot \frac{2\pi \cdot \Delta n_{\max}}{\Delta t}$$

In this context, $J_1$ is the moment of inertia of the $l_{th}$ drive-unit component, on the side of clutch 3 on which engine 1 is situated;

$\Delta n_{max}$ is the maximum allowable clutch slip;

$T_c$ is a constant torque; and $\Delta t$ is the period of time, in which a torque surge leads to an increase of the slip.

Automatic transmission 2 can be damaged by so-called torque surges, which are introduced into the drive unit by driven wheels 8 and 9. In this case, it is particularly critical, for example, to protect a variator of a CVT (continuously variable transmission). Brief slippage of such a continuously variable transmission due to a torque surge can already result in permanent damage to the continuously variable transmission. Such torque surges occur, for example, in response to passing over from a road-surface covering having a low coefficient of friction, to a road-surface covering having a high coefficient of friction. Examples include passing over from an ice-covered road surface to a dry road surface, or driving over railroad tracks.

If slip time $\Delta t$ is not significant, then surge torque $T_S$ can be set equal to constant torque $T_c$.

An advantageous refinement provides for surge torque $T_S$ being transmitted to a transmission control system, so that, e.g. the clamping load in a continuously variable transmission can be increased accordingly. The necessary clamping load in the continuously variable transmission is to be increased as a function of surge torque $T_S$.

FIG. 10 shows a detailed representation of slip controller 80. Slip controller 80 differs from slip controller 21, in that it has a minimum value characterizer 82. Minimum value characterizer 82 compares differential torque $T_R$ and surge torque $T_S$, and outputs the smaller torque as an output value.

FIG. 11 shows a corresponding slip $\Delta n$ plotted over time t, in the case of using a clutch control unit 79 according to FIG. 9. In this case, time $t_1$ denotes the time at which maximum allowable slip $\Delta n_{max}$ is reached, and $t_2$ denotes the time at which the slip caused by the torque surge has faded out. The period of time between times $t_2$ and $t_1$ is slip time $\Delta t$. In this context, FIG. 11 shows the characteristic curve of clutch slip $\Delta n$, when setpoint clutch slip $\Delta n^*$ is equal to zero. FIG. 12 shows the characteristic curve of clutch slip $\Delta n$ for the case, in which setpoint clutch slip $\Delta n^*$ is not equal to zero. In this case, clutch slip $\Delta n$ is equal to setpoint clutch slip $\Delta n^*$ at time $t_2$.

In order to prevent clutch 3 from being thermally overloaded, slip time $\Delta t$ is advantageously adjusted as a function of the thermal loading in clutch 3. To that end, the temperature of clutch 3 is estimated, using a thermodynamic model. If the estimated temperature of clutch 3 exceeds a critical temperature limit, then setpoint clutch slip $\Delta n^*$ is reduced to zero. In addition, an advantageous refinement provides for a so-called reserve clamping load being increased. For example, this can be accomplished by increasing the value of $F_0$. As an alternative to that, a so-called reserve torque can also be increased. For example, this can be accomplished by increasing the value of TC.

Figure 13:
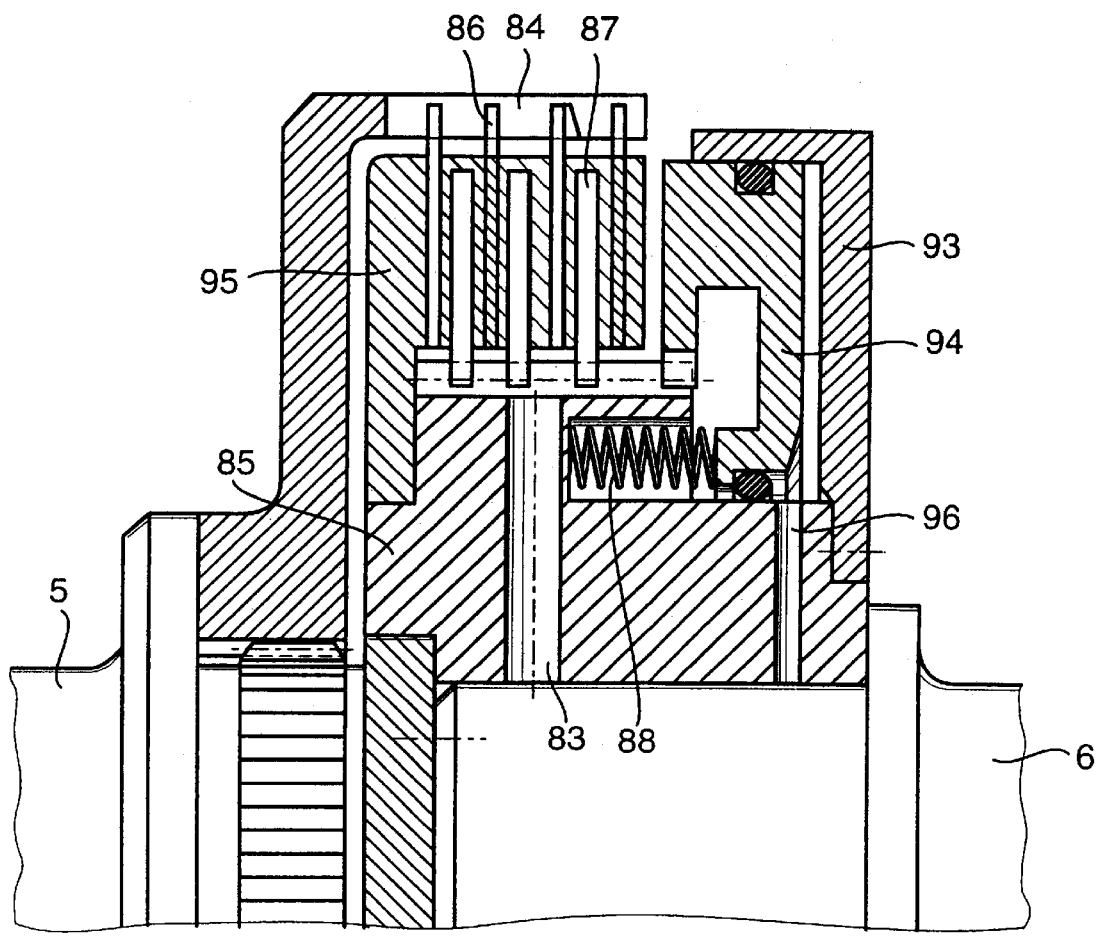

FIG. 13 shows an exemplary embodiment of a clutch 3. In this context, reference numeral 83 denotes a lubricating-oil supply line for hydraulic oil, reference numeral 84 denotes an external driver, reference numeral 85 an internal driver, reference numeral 86 an external disk, reference numeral 87 an internal disk, reference numeral 88 a restoring spring, reference numeral 93 a cylinder, reference numeral 94 a piston, reference numeral 95 a pressure plate, and reference numeral 96 denotes a pressurized-media supply line. External disks 86, which, in an advantageous refinement, are steel disks not having a friction lining, are positioned at external driver 84, which is connected to clutch input shaft 5. Internal driver 85 connected to clutch output shaft 6 receives internal disks 87, which are coated with a friction lining. When hydraulic oil is introduced through pressurized-media supply line 96, into cylinder 93, at a selected pressure level, piston 94 moves in opposition to the force of restoring spring 88, in the direction of pressure plate 95, and presses together the disk stack, which includes internal and external disks 87 and 86. In order to cool the disk stack, hydraulic oil is directed through lubricating-oil supply line 83 to internal and external disks 87 and 86.

FIG. 14 shows a further exemplary embodiment of a clutch control unit 90. Clutch control unit 90 can replace clutch control unit 12 or clutch control unit 79. As opposed to clutch control unit 79, clutch control unit 90 has an engine-torque setpoint adjuster 91. Control unit 12 can also be supplemented by such an engine-torque setpoint adjuster 91. In this context, engine-torque setpoint adjuster 91 outputs a setpoint value $T_M^*$ for the torque of engine 1, the setpoint value for the engine torque being supplied to a control unit of engine 1, in an exemplary embodiment. Apart from a torque input, setpoint engine torque $T_M^*$ can also be specified by inputting an ignition-advance angle, or by a limiting value for the engine speed. It can also be provided, that engine-torque setpoint adjuster 91 be used in place of clutch control unit 12. In this case, torque surges are limited in a vehicle drive unit, which has an engine, a clutch, and at least one driven wheel, in that a torque is transmitted between the engine and the driven wheel by pressing the clutch together, and the engine is controlled or regulated as a function of the speed of the clutch on the side of the engine, and/or as a function of the speed of clutch on the side of the driven wheel. In this context, an advantageous refinement provides for the engine being controlled and regulated as a function of the time derivative of the clutch speed on the side of the engine, and/or as a function of the time derivative of the clutch speed on the side of the driven wheel. Torque surges are advantageously limited in a vehicle drive unit having an engine, a clutch, and at least one driven wheel, in that a torque is transmitted between the engine and the driven wheel by pressing the clutch together, and the engine is controlled or regulated as a function of the time derivative of the clutch speed on the side of the engine, and/or as a function of the time derivative of the clutch speed on the side of the driven wheel.

FIGS. 15 and 16 show flow charts, which, in an exemplary embodiment, are each implemented individually or jointly on engine-torque setpoint adjuster 91. In this context, reference numerals 100 and 109 in FIG. 15 designate the beginning of the flow chart and the end of the flow chart, respectively. The functional sequence begins with a step 101, in which input clutch speed $n_E$ is input. In an additional step 102, derivative $dn_E/dt$ of input clutch speed $n_E$ is calculated. Step 102 is followed by interrogation 103, which checks if $$\frac{dn_E}{dt} \geq n_{Elim1}$$

where $n_{Elim1}$ is a preselected limiting value. If this condition is fulfilled, then a value $n_{E0}$ is calculated in step 104, where $$n_{E0} = n_E$$

Engine torque $T_M$ of engine 1 is limited in an additional step 105. To that end, a corresponding setpoint value $T_M^*$ is output, which can include a torque input, an ignition-advance-angle input, or a limitation of the maximum engine speed of engine 1 (see above). In step 105, a new value of $n_E$ is input. In addition, step 105 is followed by interrogation 106, which checks if $$n_{E0} - n_E < n_{Elim2}$$

where $n_{Elim2}$ is a preselected limiting value. If the interrogation is not fulfilled, then step 105 is executed again. But if the interrogation is satisfied, then step 107 comes next, in which the limitation of the engine torque is canceled. In other words, there is no torque input, ignition-advance angle input, or limitation of the maximum engine speed. Step 107 is followed by an interrogation 108, in which it is checked if the functional sequence should be ended. If the sequence should not be ended, then step 101 is executed again. Otherwise, the sequence is ended.

If the condition $$\frac{dn_E}{dt} \geq n_{Elim1}$$

of interrogation 103 is not fulfilled, then interrogation 108 comes next.

Reference numerals 110 and 119 in FIG. 16 designate the beginning of the sequence and the end of the sequence, respectively. The functional sequence begins with a step 111, in which output clutch speed $n_A$ is input. In an additional step 112, derivative $dn_A/dt$ of output clutch speed $n_A$ is calculated. Step 112 is followed by interrogation 113, which checks if $$\frac{dn_A}{dt} \geq n_{Alim1}$$

where $n_{Alim1}$ is a preselected limiting value. If this condition is fulfilled, then a value $n_{A0}$ is calculated, where $$n_{A0} = n_A$$

Engine torque $T_M$ of engine 1 is limited in an additional step 115. To that end, a corresponding setpoint value $T_M^*$ is output, which can include a torque input, an ignition-advance-angle input, or a limitation of the maximum engine speed of engine 1 (see above). In step 115, a new value of $n_A$ is input. Step 115 is followed by interrogation 116, in which is checked if $$n_{A0} - n_A < n_{Alim2}$$

where $n_{Alim2}$ is a preselected limiting value. If the interrogation is not fulfilled, then step 115 is executed again. But if the interrogation is satisfied, then it is followed by a step 117, in which the limitation of the engine torque is canceled. In other words, there is no torque input, ignition-advance-angle input, or limitation of the maximum engine speed.

Step 117 is followed by an interrogation 118, in which it is checked if the functional sequence should be ended. If the sequence should not be ended, then step 111 is executed again. Otherwise, the sequence is ended.
If the condition $$\frac{dn_A}{dt} \geq n_{Alim1}$$

of interrogation 113 is not fulfilled, then it is followed by interrogation 118.

LIST OF REFERENCE NUMERALS 1 engine
2 transmission
3 clutch
4 shaft
5 clutch input shaft
6 clutch output shaft
7 differential
8, 9 driven wheels
10, 11 speed sensors
12, 79, 90 clutch control unit
20 differentiator
21, 80 slip controller
22 adapter
31, 34 filter
32 negator
33 controller
35 inverse clutch model
36, 37 summer
40, 100, 110 beginning of the functional sequence
41, 42, 44, step
45, 46, 48,
101, 102,
104, 105,
107, 111,
112, 113
114, 115,
117
43, 47, 60, interrogation
103, 106,
108, 113,
116, 118,
49, 109, 119 end of the functional sequence
50, 51 friction-coefficient-slip characteristic
70 multiplier
81 protective device
82 minimum-value characterizer
83 lubricating-oil supply line
84 external driver
85 internal driver
86 external disk
87 internal disk
88 restoring spring
91 engine-torque setpoint adjuster
93 cylinder
94 piston
95 pressure plate
96 pressurized-media supply line
$n_E$ speed of clutch input shaft
$n_A$ speed of clutch output shaft
$T_M$ information about the engine torque
$\Delta T_M$ inaccuracy of the information about the engine torque
$T_E$ input torque of the clutch
$T_R$ differential torque (controller output)
$T_k$ clutch torque
$T_1$ first tolerance value
$T_2$ second tolerance value
$\Delta n$ clutch slip
$\Delta n^*$ setpoint clutch slip
i transmission ratio of the transmission
p clamping load
p* setpoint clamping load
:, :$_1$, :$_2$ coefficient of friction
$J_i$ moment of inertia of the drive unit, on the side of the clutch 1 on which the engine is situated
$\Delta n_{max}$ maximum allowable clutch slip
$T_c$ constant torque
$\Delta t$ the period of time, in which a torque surge leads to an increase of the slip.
$A_R$ friction surface of the steel disks of the clutch
$Z_R$ number of friction surfaces of the clutch
t time
$T_{MK}$ corrected engine torque
$F_0$ minimum required force for transmitting a torque via the clutch
$T_S$ surge torque
$t_1$ time
$t_2$ time
$T_M^*$ setpoint value for the engine torque
d( )/dt derivative
$n_{Elim1}$ preselected limiting value
$n_{Elim2}$ preselected limiting value
$n_{Alim1}$ preselected limiting value
$n_{Alim2}$ preselected limiting value
$n_{E0}$ value
$n_{A0}$ value

What is claimed is:

1. A method for operating a clutch (3) between an internal combustion engine (1) and at least one driven wheel (8, 9) of a vehicle, a torque being transmitted between the engine (1) and the driven wheel (8, 9) by pressing the clutch (3) together with a clamping force or a clamping load (p), wherein the clamping force or the clamping load (p) is adjusted as a function of information about an engine torque generated by the engine (1), and as a function of information representative of the inaccuracy ($\Delta T_M$) of the information about the engine torque ($T_M$) generated by the engine (1), and wherein the information representative of the inaccuracy of the information about the engine torque is representative of a statistical deviation from a statistical average value of the information about the engine torque generated by the engine.

2. The method as recited in claim 1, wherein the clamping force or the clamping load (p) is ascertained as a function of a clutch slip ($\Delta n$) in the clutch (3), while the torque is transmitted between the engine (1) and the driven wheel (8, 9).

3. The method as recited in claim 1, wherein the clamping force or the clamping load (p) is adjusted as a function of the torque transmitted by the clutch (3).

4. The method as recited in claim 3, wherein the torque transmitted by the clutch (3) is ascertained as a function of the clutch slip ($\Delta n$) in the clutch (3), while the torque is transmitted between the engine (1) and the driven wheel (8, 9).

5. The method as recited in claim 4, wherein the correlation between the torque transmitted by the clutch (3) and the clutch slip ($\Delta n$), or the correlation between the friction coefficient ($\mu$) of the clutch (3) and the clutch slip, are adapted when the inaccuracy ($\Delta T_M$) of the information about the engine torque is less than or equal to a first tolerance value ($T_1$).

6. The method as recited in claim 5, wherein the adaption is carried out as a function of the clamping force or the clamping load (p).

7. The method as recited in claim 5, wherein the adaption is carried out as a function of the difference between the clutch slip (Δn) and a setpoint value (Δn*) for the clutch slip (Δn).

8. The method as recited in claim 5, wherein the adaptation is carried out as a function of the engine torque ($T_M$).

9. The method as recited in claim 1, wherein the clamping force or the clamping load (p) is adjusted as a function of the friction coefficient (μ) of the clutch (3).

10. The method as recited in claim 9, wherein the coefficient of friction (μ) of the clutch (3) is ascertained as a function of the clutch slip (Δn) in the clutch (3), while the torque is transmitted between the engine (1) and the driven wheel (8, 9).

11. The method as recited in claim 1,
wherein the clamping force or the clamping load (p) is regulated by a controller (21, 33, 80), as a function of the difference between the clutch slip (Δn) and a setpoint value (Δn*) for the clutch slip (Δn).

12. A method of operating a clutch (3) between an internal combustion engine (1) and at least one driven wheel (8, 9) of a vehicle, a torque being transmitted between the engine (1) and the driven wheel (8, 9) by pressing the clutch (3) together with a clamping force or a clamping load (p),
wherein the clamping force or the clamping load (p) is adjusted at least one of:
as a function of an engine torque generated by the engine (1);
as a function of the inaccuracy ($\Delta T_M$) of the information about the engine torque ($T_M$) generated by the engine (1); and
as a function of the speed of the engine (1),
wherein the clamping force or the clamping load (p) is adjusted as a function of the torque transmitted by the clutch (3).
wherein the torque transmitted by the clutch (3) is ascertained as a function of the clutch slip (Δn) in the clutch (3), while the torque is transmitted between the engine (1) and the driven wheel (8, 9).
wherein the correlation between the torque transmitted by the clutch (3) and the slip (Δn), or the correlation between the friction coefficient (μ) of the clutch (3) and the clutch slip, are adapted when the inaccuracy ($\Delta T_M$) of the information about the torque is less than or equal to a first tolerance value ($T_1$), and
wherein the coefficient of friction μ of the clutch (3) is corrected according to $$\mu = \mu + \frac{T_M \cdot i}{T_M \cdot i + T_R}$$

where
$T_M \cdot i$ is the input torque introduced into the clutch (3) by the engine (1), taking into consideration the transmission ratio i of a transmission between the engine (1) and the clutch (3); and
$T_R$ is a differential torque output by the controller (33).

13. The method as recited in claim 1, wherein the information about the engine torque ($T_M$) generated by the engine (1) is corrected, when the inaccuracy ($\Delta T_M$) of the information about the engine torque ($T_M$) is greater than a second tolerance value ($T_2$).

14. The method as recited in claim 13, wherein the information about the engine torque ($T_M$) generated by the engine (1) is corrected as a function of the difference between the clutch slip (Δn) and the setpoint value (Δn*) for the clutch slip (Δn).

15. The method as recited in claim 14, wherein the information about the engine torque generated by the engine (1) is corrected according to
where
$T_M$ is the engine torque,
$T_{MK}$ is the corrected engine torque,
$T_R$ is the differential torque output by the controller, and $$T_{MK} = T_M + \frac{T_R}{i}$$

i is the transmission ratio of a transmission (2) disposed between the engine (1) and the clutch (3).

16. The method as recited in claim 13, wherein the first tolerance value ($T_1$) is equal to the second tolerance value ($T_2$).

17. The method as recited in claim 1, wherein the clutch (3) has a clutch lining, and the clutch lining is selected to have a certain friction-coefficient characteristic, it being especially provided, that, in the range of small clutch-slip values, the clutch friction coefficient increase more sharply with increasing clutch slip, than in the range of larger clutch-slip values.

18. A device for operating a clutch (3) arranged between an internal combustion engine (1) and at least one driven wheel (8, 9) of a vehicle, a torque being transmitted between the engine (1) and the driven wheel (8, 9) by pressing the clutch (3) together with a clamping force or a clamping force or a clamping load (p), wherein a clutch control unit (12) is provided, in order to adjust the clamping force or the clamping load (p) as a function of information about an engine torque ($T_M$) generated by the engine (1), and as a function of information representative of the inaccuracy ($\Delta T_M$) of the information about the engine torque ($T_M$) generated by the engine (1), and wherein the information representative of the inaccuracy of the information about the engine torque is representative of a statistical deviation from a statistical average value of the information about the engine torque generated by the engine.

19. The device as recited in claim 18, wherein the clutch has a clutch lining, and the clutch lining is selected to have a certain friction-coefficient characteristic, it being especially provided that, in the range of small clutch-slip values, the clutch friction coefficient increase more sharply with increasing clutch slip, than in the range of larger clutch-slip values.

20. A method for operating a clutch arranged between an internal combustion engine and at least one driven wheel of a vehicle, comprising:
pressing the clutch together with one of a clamping force and a clamping load to transmit a torque between the engine and the at least one driven wheel; and
adjusting one of the clamping force and the clamping load as a function of information about an engine torque generated by the engine and information representative of an inaccuracy of information about the engine torque,
wherein the information representative of the inaccuracy of the information about the engine torque is representative of a statistical deviation from a statistical average value of the information about the engine torque generated by the engine.

21. The method according to claim 20, further comprising ascertaining one of the clamping force and the clamping load as a function of a clutch slip in the clutch, while the torque is transmitted between the engine and the at least one driven wheel.

22. The method according to claim 20, further comprising adjusting one of the clamping force and the clamping load as a function of torque transmitted by the clutch.

23. The method according to claim 22, further comprising ascertaining the torque transmitted by the clutch as a function of clutch slip in the clutch while the torque is transmitted between the engine and the driven wheel.

24. The method according to claim 23, further comprising adapting one of a correlation between the torque transmitted by the clutch and the clutch slip and a correlation between a friction coefficient of the clutch and the clutch slip, when the inaccuracy of the information about the engine torque is less than or equal to a first tolerance value.

25. The method according to claim 24, wherein the adapting is performed as a function of one of the clamping force and the clamping load.

26. The method according to claim 24, wherein the adapting is performed as a function of a difference between the clutch slip and a setpoint value for the clutch slip.

27. The method according to claim 24, wherein the adapting is performed as a function of the engine torque.

28. The method according to claim 20, further comprising adjusting one of the clamping force and the clamping load as a function of a fiction coefficient of the clutch.

29. The method according to claim 28, further comprising ascertaining the coefficient of friction of the clutch as a function of clutch slip in the clutch while the torque is transmitted between the engine and the driven wheel.

30. The method according to claim 20, further comprising regulating one of the clamping force and the clamping load by a controller as a function of a difference between clutch slip and a setpoint value for the clutch slip.

31. The method according to claim 20, further comprising correcting information about the engine torque generated by the engine when the inaccuracy of the information about the engine torque is greater than a second tolerance value.

32. The method according to claim 31, wherein the information about the engine torque generated by the engine is corrected as a function of a difference between clutch slip and a setpoint value for the clutch slip.

33. The method as recited in claim 31, wherein a first tolerance value is equal to the second tolerance value.

34. The method according to claim 20, further comprising providing the clutch lining having a certain friction-coefficient characteristic such that in a range of small clutch-slip values, the clutch friction coefficient increases more sharply with increasing clutch slip than in a range of larger clutch-slip values.

35. A method for operating a clutch arranged between an internal combustion engine and at least one driven wheel of a vehicle, comprising:
pressing the clutch together with one of a clamping force and a clamping load to transmit a torque between the engine and the at least one driven wheel; and
adjusting one of the clamping force and the clamping load at least one of:
as a function of an engine torque generated by the engine and an inaccuracy of information about the engine torque; and
as a function of a speed of the engine;
adjusting one of the clamping force and the clamping load as a function of torque transmitted by the clutch;
ascertaining the torque transmitted by the clutch as a function of clutch slip in the clutch while the torque is transmitted between the engine and driven wheel;
adapting one of a correlation between the torque transmitted by the clutch and the clutch slip and a correlation between a friction coefficient of the clutch and the clutch slip, when the inaccuracy of the information about the engine torque less than or equal to a first tolerance value; and
correcting the coefficient of the clutch according to:

$$\mu = \mu + \frac{T_M \cdot i}{T_M \cdot i + T_R}$$

wherein:
$\mu$ represents the coefficient of friction;
$T_M \cong i$ represents an input torque introduced into the clutch by the engine, taking into consideration a transmission ratio i of a transmission between the engine and the clutch; and
$T_R$ represents a differential torque output by a controller.

36. A method for operating a clutch arranged between an internal combustion engine at least one driven wheel of a vehicle, comprising:
pressing the clutch together with one of a clamping force and a clamping load to transmit a torque between the engine and the at least one driven wheel; and
adjusting one of the clamping force and the clamping load at least one of:
as a function of an engine torque generates by the engine and an inaccuracy of information about the engine torque; and
as a function of a speed of the engine; and
correcting information about the engine torque generated by the engine when the inaccuracy of the information about the engine torque is greater than a second tolerance value;
wherein the information about the engine torque generated by the engine is corrected as a function of a difference between clutch slip and a setpoint value for the clutch slip; and
wherein the information about the engine torque generated by the engine is corrected according to:

$$T_{MK} = T_M + \frac{T_R}{i}$$

wherein
$T_M$ represents the engine torque;
$T_{MK}$ represents the corrected engine torque;
$T_R$ represents a differential torque output by a controller; and
i represents a transmission ratio of a transmission arranged between the engine and the clutch.

37. A device for operating a clutch arranged between an internal combustion engine and at least one driven wheel of a vehicle, comprising:
a clutch control unit configured to adjust one of a clamping force and a clamping load as a function of information about an engine torque generated by the engine and as a function of information representative of the inaccuracy of information about the engine torque generated by the engine, the torque transmitted between the engine and the at least one driven wheel by pressing the clutch together with one of the clamping force and the clamping load, wherein the information representative of the inaccuracy of the information about the engine torque generated by the engine is representative of a statistical deviation from a statistical average value of the information about the engine torque generated by the engine.

38. The device according to claim 37, wherein the clutch includes a clutch lining having a certain friction-coefficient characteristic such that in a range of small clutch-slip values, the clutch friction coefficient increases more sharpely with increasing clutch slip than in a range of larger clutch-slip values.

* * * * *